(12) United States Patent
Rodriguez Bravo

(10) Patent No.: US 12,547,764 B2
(45) Date of Patent: Feb. 10, 2026

(54) PREVENT SCAMS IN REAL TIME IN AN INTERACTIVE COMMUNICATION ENVIRONMENT

(71) Applicant: Kyndryl, Inc., New York, NY (US)

(72) Inventor: Cesar Augusto Rodriguez Bravo, Alajuela (CR)

(73) Assignee: Kyndryl, Inc., New York, NY (US)

( * ) Notice: Subject to any disclaimer, the term of this patent is extended or adjusted under 35 U.S.C. 154(b) by 307 days.

(21) Appl. No.: 18/354,711

(22) Filed: Jul. 19, 2023

(65) Prior Publication Data
US 2025/0028855 A1 Jan. 23, 2025

(51) Int. Cl.
G06F 21/62 (2013.01)
H04L 9/40 (2022.01)

(52) U.S. Cl.
CPC ...... *G06F 21/6245* (2013.01); *H04L 63/1466* (2013.01)

(58) Field of Classification Search
CPC .................................................. G06F 21/6245
See application file for complete search history.

(56) References Cited

U.S. PATENT DOCUMENTS

| | | | |
|---|---|---|---|
| 10,270,788 B2* | 4/2019 | Faigon et al. | |
| 10,846,395 B2* | 11/2020 | Chrysaidos | |
| 10,943,397 B2 | 3/2021 | De Los Reyes et al. | |
| 11,019,090 B1 | 5/2021 | Smith et al. | |
| 11,102,244 B1 | 8/2021 | Jakobsson et al. | |
| 11,425,563 B2 | 8/2022 | Turgeman et al. | |
| 2016/0218998 A1* | 7/2016 | Sheth et al. | |
| 2016/0344770 A1* | 11/2016 | Verma et al. | |
| 2018/0097841 A1 | 4/2018 | Stolarz et al. | |
| 2019/0149575 A1 | 5/2019 | Bahrs et al. | |

(Continued)

FOREIGN PATENT DOCUMENTS

| | | | | |
|---|---|---|---|---|
| CN | 110290155 A | | 9/2019 | |
| WO | WO-2021154724 A1 * | | 8/2021 | ............... G06N 3/09 |
| WO | 2022123556 A1 | | 6/2022 | |

OTHER PUBLICATIONS

Anonymous, "Social Engineering Fraud Detection from Diversiform Dialog Analysis," IP.com, IPCOM000263336D, Aug. 19, 2020, 7 pages.

(Continued)

*Primary Examiner* — Simon P Kanaan
(74) *Attorney, Agent, or Firm* — CANTOR COLBURN LLP; Erik Swanson

(57) ABSTRACT

Embodiments relate to automatically preventing scams in real time in an interactive communication environment. A machine learning model determines that at least one communication from a first user to a second user in an interactive communication environment includes a potential threat, the interactive communication environment providing real time communications between the first user of a first computer system to the second user of a second computer system. The potential threat of the at least one communication is determined to above a threshold. An overlay is displayed to the second user on the second computer system in which the overlay displays metadata about the first user and informs the second user to avoid providing any sensitive information in the interactive communication environment.

19 Claims, 9 Drawing Sheets

(56) References Cited

U.S. PATENT DOCUMENTS

2020/0067861 A1  2/2020 Leddy et al.
2020/0366671 A1  11/2020 Larson et al.

OTHER PUBLICATIONS

Richardson, "Changing Cybersecurity with Natural Language Processing," NVIDIA Technical Blog, Oct. 19, 2022, 3 pages.
Salim, "Dubai Metaverse Assembly announced for September; to showcase 'real' meetings in virtual world," Khaleej Times, Jul. 19, 2022, 3 pages.
Shepherd, "20 Essential Meta Statistics You Need to Know in 2023," Social Shepherd, Feb. 23, 2023, 12 pages.

\* cited by examiner

FIG. 2 SYSTEM 200

FIG. 3
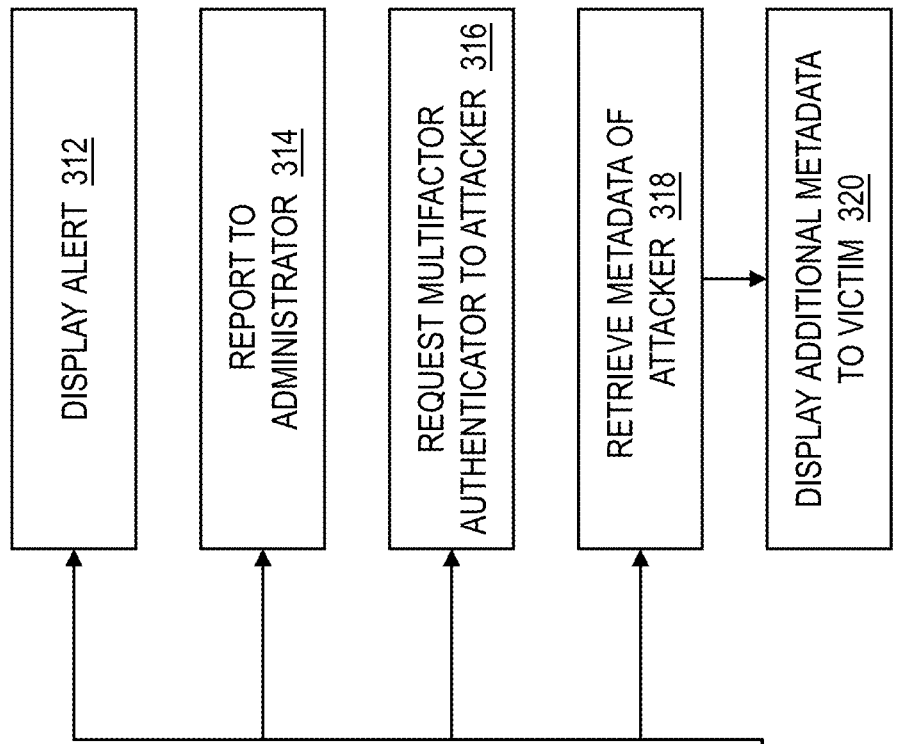
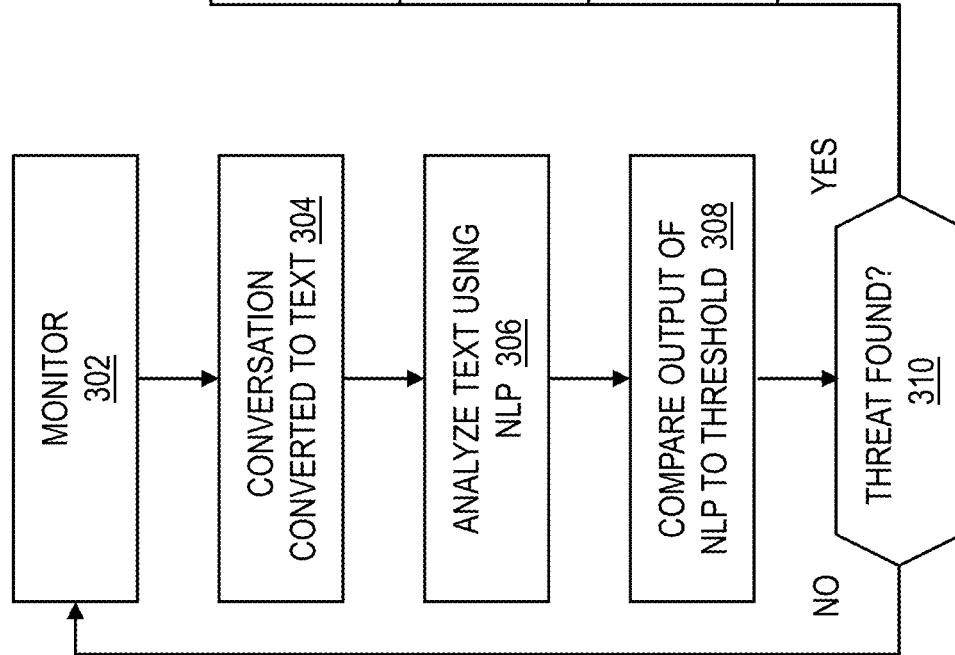

PREVENT SCAMS IN REAL TIME IN AN INTERACTIVE COMMUNICATION ENVIRONMENT

BACKGROUND

The present invention generally relates to computer systems, and more specifically, to computer-implemented methods, computer systems, and computer program products configured and arranged to prevent scams in real time in an interactive communication environment.

Virtual reality is a simulated experience that can employ tracking and three-dimensional (3D) near-eye displays to offer the user an immersive feel of a virtual world. Applications of virtual reality may include entertainment particularly video games, education, business, etc. Other distinct types of virtual reality technology include augmented reality and mixed reality, sometimes referred to as extended reality. Virtual reality systems can use virtual reality headsets to generate realistic images, sounds, and other sensations that simulate a user's physical presence in the virtual reality. Virtual reality equipment enables a user to look around the artificial world, move around in it, and interact with virtual features or items. The effect of simulating a user's physical presence in the virtual reality is commonly created by virtual reality headsets including, for example, a head-mounted display with a small screen in front of the eyes.

SUMMARY

Embodiments of the present invention are directed to computer-implemented methods for preventing scams in real time in an interactive communication environment. A non-limiting computer-implemented method includes determining, using a machine learning model, that at least one communication from a first user to a second user in an interactive communication environment includes a potential threat, the interactive communication environment providing real time communications between the first user of a first computer system to the second user of a second computer system. The computer-implemented method includes determining that the potential threat of the at least one communication is above a threshold. The computer-implemented method includes, in response to the potential threat being above the threshold, causing an overlay to be displayed to the second user on the second computer system in which the overlay displays metadata about the first user and informs the second user to avoid providing any sensitive information in the interactive communication environment.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a flowchart of a computer-implemented method for automatically preventing scams in real time in an interactive communication environment and for automatically performing security actions to prevent the scam based on the potential threat according to one or more embodiments of the present invention;

DETAILED DESCRIPTION

Figure 1:
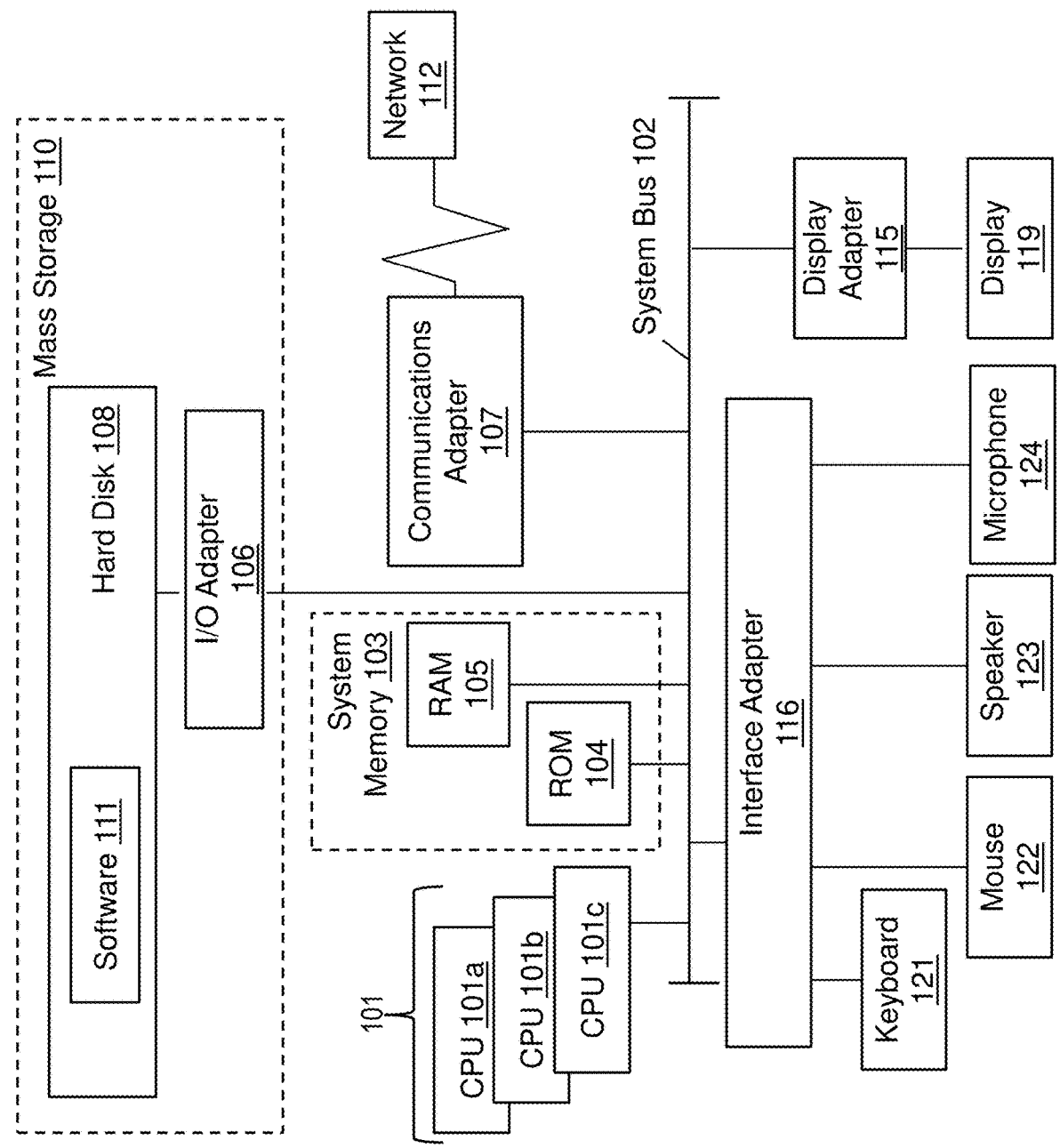
FIG. 1 depicts a block diagram of an example computer system for use in conjunction with one or more embodiments of the present invention.

One or more embodiments automatically prevent scams in real time in an interactive communication environment. According to one or more embodiments, a system is provided that uses speech-to-text to convert the user's conversation into text. Then, the system uses natural language processing (NLP) to search for potential social engineering attacks in the interactive communication environment. The system is configured to analyze potential threats to determine when a threat is present. One or more embodiments take actions to alert the user of the threat in the interactive communication environment, thereby preventing cybersecurity issues in the interactive communication environment.

Interactive communication environments can include any interactive communication system in which users can communicate in real time with each other. Interactive communication environments can include various types of computing environments, which may be computer generated environments that require computer systems/equipment to access and interact. For example, one could not access and operate in an interactive communication environment with a simple pen/pencil and sheet of paper, as understood by one of ordinary skill in the art. Interactive communication environments can include virtual reality, gaming environments of a gaming systems, chat environments, etc. Interactive communication environments allow a communication, such as an audio communication (i.e., voice) and/or text communication, from a first user to be automatically output in real time, for example, on a display and/or on speakers to a second user without requiring the second user to take an action to receive the output. For example, emails between users may not be considered an interactive communication environment because, even after an email has been sent to the recipient, the recipient has to take an additional action/step to access/view the email such as opening the email, hovering over the email, selecting the email, etc.

Virtual reality is the latest milestone in the digital evolution of social media and web interactions. A well-known virtual environment for virtual reality has 28.7 billion active users. Now, as can be imagined, a virtual environment with such a large number of users will have a lot of risks. One of those risks is a scam that is engineered to take a person's sensitive information. In the virtual environment, scammers are looking to find the next victim. In contrast to current social media, the virtual reality allows greater interaction between people, and the virtual reality is exploited by the attackers. Additionally, the level of interaction provided by the immersive experiences in interactive communication environments, such as virtual reality, gaming environments, etc., allow the attackers to perform more successful social engineering attacks in order to obtain sensitive information from a user.

Technical solutions and benefits include a novel method and system to prevent social engineering attacks in immersive environments according to one or more embodiments. The system is configured to convert an audio conversation into text from the interactive communication environment and parse the text using natural language processing. The system analyzes the text and displays a message to alert a user about the scam or social engineering attack. Further, the system searches computer memory, retrieves metadata of a potential attacker's account in the interactive communication environment, and informs the user of the same. In response to the potential scam or attack, the system causes visual alerts such as modifying the display of the user in the interactive communication environment and/or causes audio alerts such as causing an audio alarm and/or message to be output on the speakers of the user in the interactive communication environment. The system may cause the user's microphone to be temporarily disabled to thereby prevent the user from being heard speaking the sensitive information. The system may prevent the audio spoken by the user from being uploaded and/or heard in the interactive communication environment. The system may temporarily disable the text of the user, thereby causing the text of the user to be blocked from being uploaded and/or displayed in the interactive communication environment. In accordance with one or more embodiments, the system can cause many temporary security actions to be performed to block, disable, etc., one or more functions of the user in the in the interactive communication environment, such that the user is prevented from communicating personal sensitive information as a response to the scam or attack.

One or more embodiments described herein can utilize machine learning techniques to perform tasks, such as classifying a feature of interest. More specifically, one or more embodiments described herein can incorporate and utilize rules-based decision making and artificial intelligence (AI) reasoning to accomplish the various operations described herein, namely classifying a feature of interest.

The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," "a trained classifier," and/or "trained machine learning model") can be used for classifying a feature of interest. In one or more embodiments, machine learning functionality can be implemented using an Artificial Neural Network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional Neural Networks (CNN) are a class of deep, feed-forward ANNs that are particularly useful at tasks such as, but not limited to analyzing visual imagery and natural language processing (NLP). Recurrent Neural Networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, a microphone 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121, the mouse 122, and the microphone 124, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
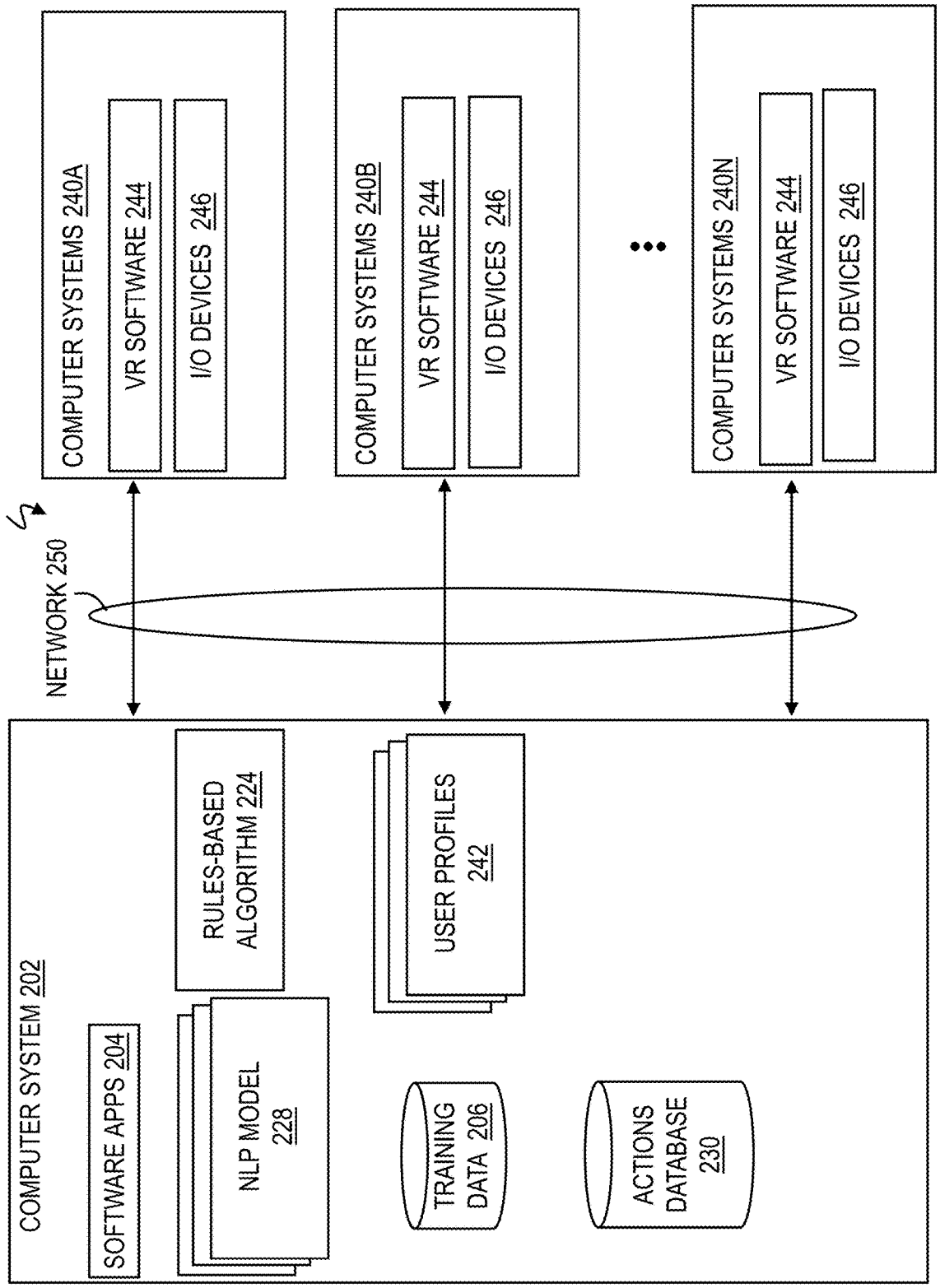
FIG. 2 depicts a block diagram of an example system for automatically preventing scams in real time in an interactive communication environment and for automatically performing security actions to prevent the scam based on the potential threat (i.e., scam, attack, etc.) according to one or more embodiments of the present invention.

FIG. 2 depicts a block diagram of an example system 200 configured for automatically preventing scams in real time in an interactive communication environment and for automatically performing security actions to prevent the scam based on the potential threat (i.e., scam, attack, etc.) according to one or more embodiments. The system 200 includes a computer system 202 configured to communicate over a network 250 with many different computer systems, such as a computer system 240A for providing the interactive communication environment such as, for example, virtual reality, video gaming, etc., to a user, a computer system 240B for providing the interactive communication environment to a user, through a computer system 240N for providing the interactive communication environment to a user. The computer systems 240A, 240B, through 240N can generally be referred to as computer systems 240 and are utilized to access the interactive communication environment including virtual reality, video gaming, etc., offered by the computer system 202.

For explanation purposes and not limitation, some example scenarios of the interactive communication environment may discuss virtual reality. It should be appreciated that one or more embodiments are not limited to examples utilizing virtual reality, and the discussions apply by analogy to any real time interactive communication environment. Some example scenarios may identify a user of computer system 240A as a potential attacker and a user of computer system 240B as a potential victim in the interactive communication environment hosted by and/or generated by one or more computer systems 202.

In one or more embodiments, the computer systems 240 can be representative of any type of virtual reality equipment, gaming equipment, and/or device for experiencing a virtual environment, including a virtual reality headset. The computer systems 240 can include various software and hardware components, including virtual reality software 244 for general virtual reality operations known by one of ordinary skill in the art. Although virtual reality is utilized as an example, the virtual reality software 244 can be representative of gaming software on well-known gaming systems. The computer systems 240 can include one or more input/output (I/O) devices 246 including cameras, a microphone, a display, and other peripherals. The computer systems 240 can be coupled to a controller, such as a handheld controller. The computer system 202, computer systems 240, virtual reality software 244, software applications 204, rules-based algorithm 224, NLP models 228, etc., can include functionality and features of the computer system 100 in FIG. 1 including various hardware components and various software applications such as software 111 which can be executed as instructions on one or more processors 101 in order to perform actions according to one or more embodiments of the invention. The software application 204 can include, be integrated with, and/or call various other pieces of software, algorithms, application programming interfaces (APIs), etc., to operate as discussed herein. The software applications 204 may be representative of numerous software applications designed to work together. Each of the users of the computer systems 240A-240N have registered with registration and authentication software for a user account in order to utilize the virtual reality services provided by computer system 202, and each of the users has its own user account in its own user profile in user profiles 242. The user profile may record when the user account signs on and signs off the virtual reality, actions taken in virtual reality, etc. The user profile may record when a user account is created, who are the friends/followers, the number of friends/followers, etc. The user profile of a user may include the Internet protocol (IP) address of the user, the location of the user, the connected time of the user, etc. The software applications 204 can access and/or include the registration and authentication software in order to control access of the user accounts in user profiles 242 for users. The software applications 204 can perform actions and/or cause any actions to be performed for any of the user accounts in the user profiles 242 when the computer 202 determines a potential scam or attack directed to a user as discussed herein.

The computer system 202 may be representative of numerous computer systems and/or distributed computer systems configured to provide virtual reality services to users of the computer systems 240. The computer system 202 can be part of a cloud computing environment such as a cloud computing environment 50 depicted in FIG. 8, as discussed further herein. The network 250 can be a wired and/or wireless communication network.

FIG. 3 is a flowchart of a computer-implemented method 300 for automatically preventing scams in real time in an interactive communication environment and for automatically performing security actions to prevent the scam based on the potential threat (i.e., scam, attack, etc.) according to one or more embodiments. The computer-implemented method 300 is executed by the computer system 202. Reference can be made to any figures discussed herein.

Figure 4:
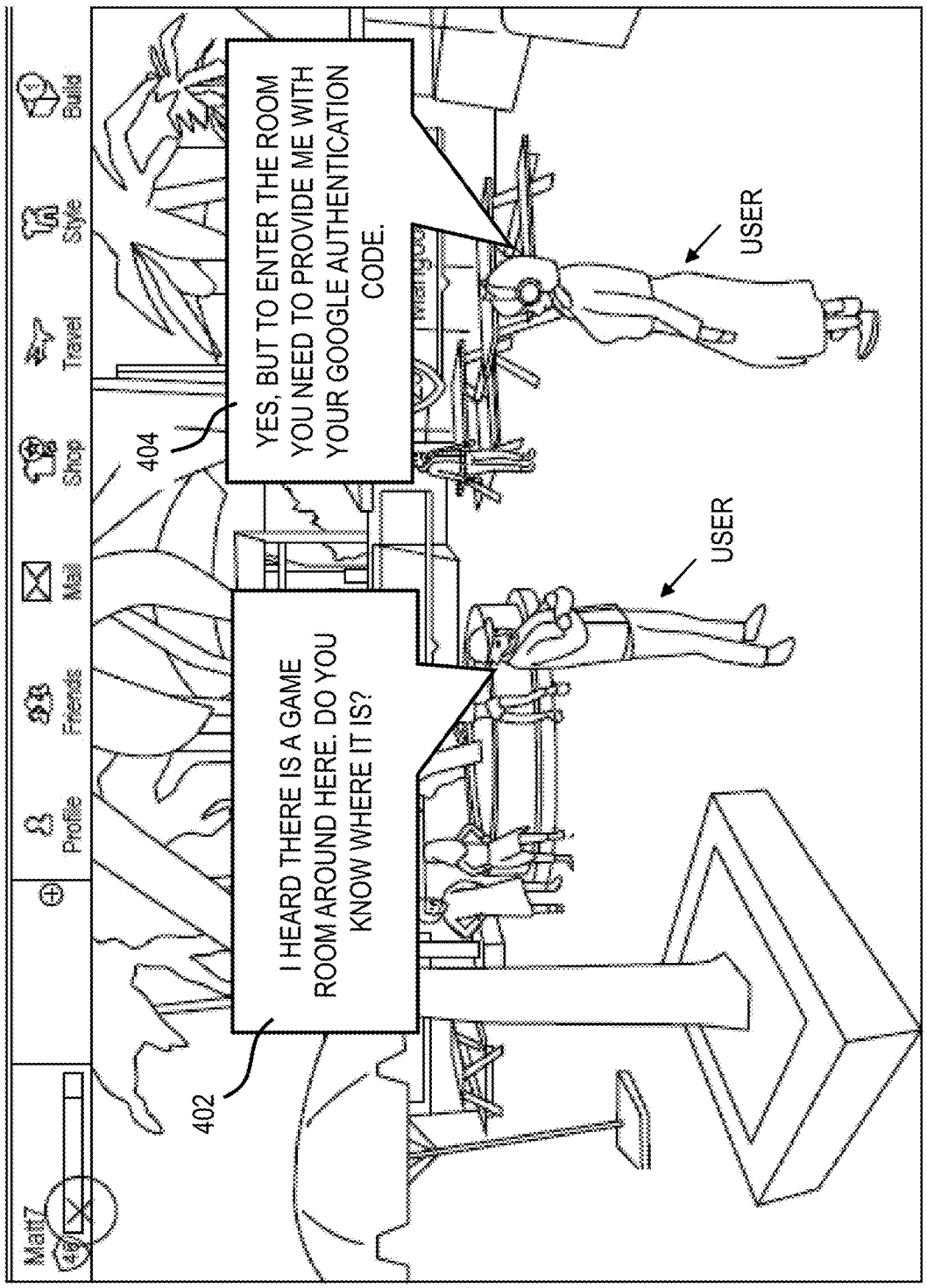
FIG. 4 depicts an example interactive communication environment for any user avatar to communicate with another user avatar according to one or more embodiments of the present invention.

At block 302 of the computer-implemented method 300, one or more software applications 204 of computer system 202 are configured to monitor communications of the computer systems 240 in an example interactive communication environment 400 (e.g., a virtual environment) depicted in FIG. 4. The software application 204 can include, employ, and/or call a monitoring engine that is configured to capture communications (including voice communications, text communications (e.g., including text messages), etc.). In the interactive communication environment 400, one user can type messages to another user, and vice versa. In the interactive communication environment 400, one user can verbally communicate by voice to another user, and vice versa, as depicted in FIG. 4. FIG. 4 depicts an example interactive communication environment 400 (e.g., a virtual environment in virtual reality) for any user avatar to communicate with another user avatar according to one or more embodiments. Example user avatars are illustrated in a virtual world in the interactive communication environment 400 of FIG. 4. The user avatars of users can freely maneuver and interact with objects in the virtual environment.

At block 304, one or more software applications 204 of computer system 202 are configured to convert the communications (e.g., the conversation) between the users to text. The software applications 204 may employ, call, and/or instruct a speech-to-text engine (not shown) to covert the audio to text as understood by one of ordinary skill in the art.

In FIG. 4, the conversation may be the communication 402 of one user and the communication 404 of the other user. The communications 402 and 404 can be audio communications such as voice that has been converted to text. In some embodiments, the communications 402 and 404 can be text. In one or more embodiments, the communications 402 and 404 can be both audio and text, which can assist some users who may prefer one type of communication.

Referring to FIG. 3, at block 306, one or more software applications 204 of computer system 202 are configured to input the text to one or more machine learning models and cause the machine learning models to analyze the text for a potential threat. In one or more embodiments, the software applications 204 are configured employ, call, and/or include one or more cognitive engines, such as one or more natural language processing (NLP) models 228, to determine the intent of the text. In the example, the users are in a conversation, and the potential attacker/scammer states that to enter a room (e.g., a game room, etc.) in the interactive communication environment the potential victim needs to provide his/her authentication code from his/her authentication application (e.g., Google® authenticator). It is noted that the potential scammer can be a request to the potential victim for any type of personal sensitive information, such as, for example, the communication 404 by the user of computer system 240A. Personal sensitive information may include but is not limited to banking information, pins, codes, passwords, social security numbers, confidential information, authentication codes for an authentication application, financial account numbers and associated pins, credit card numbers, etc. In one or more embodiments, there can be a different NLP model 228 trained to determine requests for each type of personal sensitive information. The NLP models 228 can be trained on training data 206 having socially engineered requests for banking information, pins, codes, passwords, social security numbers, confidential information, authentication codes for an authentication application, financial account numbers and associated pins, credit card numbers, etc.

The NLP model 228 may include and/or start from a pretrained NLP model. A pretrained model is a model that has been trained on a large dataset and can be used as a starting point for other tasks. Examples of a few known pretrained models include bidirectional encoder representations from transformers (BERT), generative pretrained transformer 2 (GPT-2), embeddings from language models (ELMo), transformer-XL, robustly optimized BERT, etc. Additionally, the NLP model 228 can be further trained on training data 206. The training data 206 can include historical data of past textual data having an intent to obtain personal sensitive information from a potential victim.

The training data 206 of requests for personal sensitive information may be labeled accordingly as either having intent (e.g., a high value/score indicative of intent) to obtain personal sensitive information or not having intent (e.g., a low value/score indicative of no intent) to obtain personal sensitive information, thereby improving the training of the NLP algorithm(s) of the NLP model 228. Example machine learning algorithms for NLP may include but are not limited to the following algorithms: support vector machines (SVM), Naive Bayes, logistic regression, decision trees, random forests, K-nearest neighbors, gradient boosting, etc. Example deep machine learning algorithms for NLP may include convolutional neural networks (CNNs), recurrent neural networks (RNNs), long short-term memory (LSTM)

networks, transformer networks, gated recurrent units (GRUs), deep belief networks (DBNs), generative adversarial networks (GANs), etc.

Referring to FIG. 3, at blocks 308 and 310, in response to receiving the output from the NLP model 228, one or more software applications 204 of computer system 202 are configured to cause a rules-based algorithm 224 to compare the output, which can be a value/score of intent to obtain personal sensitive information, to a threshold value in order to determine if the potential threat is found. For example, the value/score from the NLP model 228 may have to meet and/or exceed a threshold value (e.g., of 0.70 or 70%) for the potential threat to be found. If the threshold value is not met, flow returns to block 302.

An example of a rules-based system is a domain-specific expert system that uses rules to make deductions or choices. The rules-based system includes a set of facts or source of data related to capturing objects, and a set of rules for manipulating that data. These rules are sometimes referred to as "If statements" as they tend to follow the line of "IF X happens THEN do Y."

Figure 5:
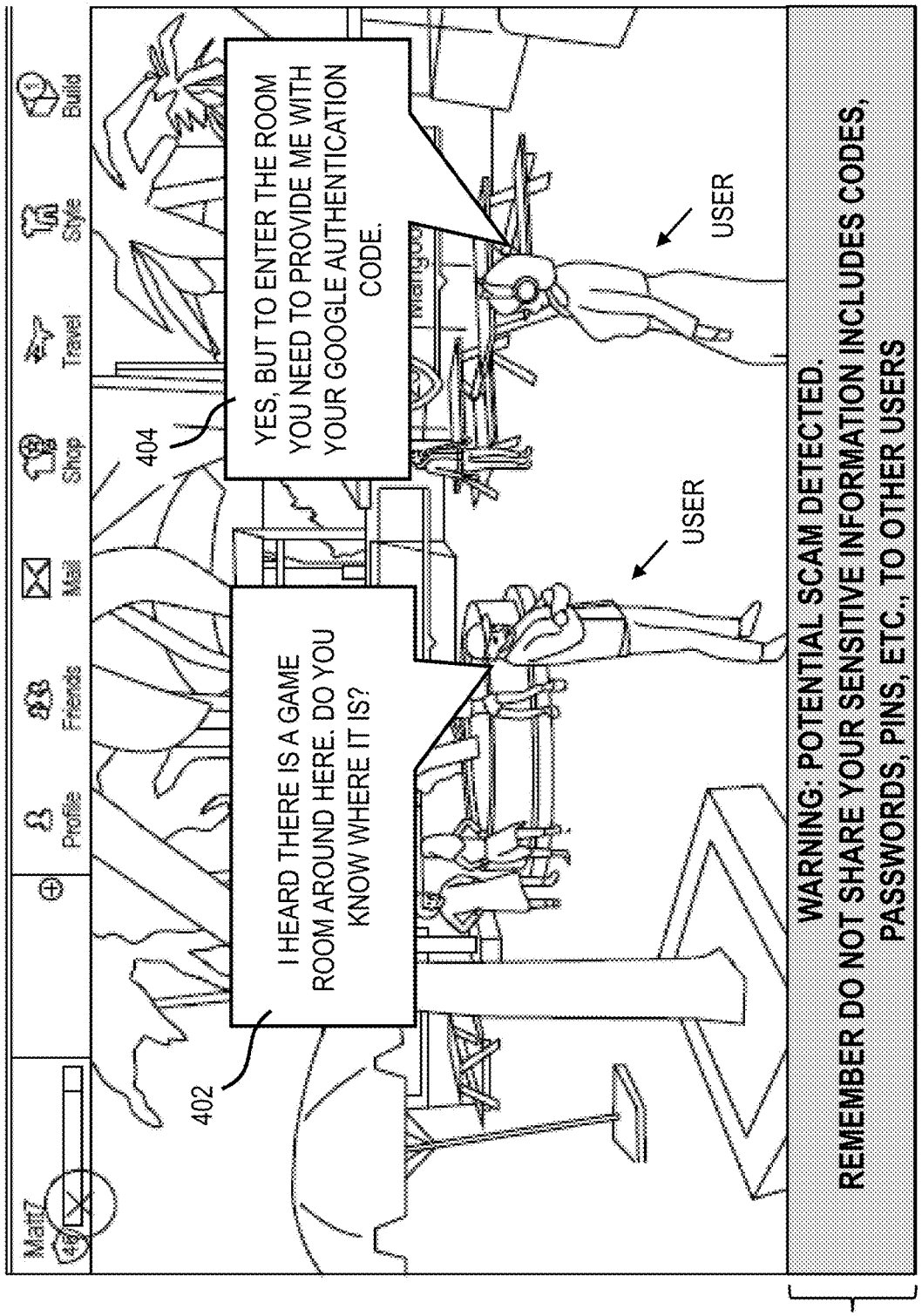
FIG. 5 depicts an example interactive communication environment in which one or more overlays are displayed as an overlaid alert/warning on the screen viewed by a potential victim and/or a potential attacker according to one or more embodiments of the present invention.

At blocks 312, 314, 316, and 318, in response to the potential threat of the potential attacker/scammer being found, one or more software applications 204 of computer system 202 are configured to perform one or more actions to prevent, block, and/or stop the potential threat from occurring in the interactive communication environment 400 generated by the computer system 202. In one or more embodiments, the actions can be obtained from an action database 230. At block 312, the software applications 204 can cause display of an alert on the display (e.g., display 119) of the computer system 240B of the potential victim and/or cause an audio alert on the speakers (e.g., speakers 123) of the computer system 240B of the potential victim. FIG. 5 depicts an example interactive communication environment 400 (e.g., a virtual environment in virtual reality) in which an overlay 420 is displayed as an overlaid alert/warning on the screen viewed by the potential victim according to one or more embodiments. In one or more embodiments, the alert overlay 420 can simultaneously be displayed on the screen viewed by the potential attacker/scammer on computer system 240A.

Referring to FIG. 3, at block 314, the software applications 204 can report the potential attack/scam to the system administrator of the interactive communication environment 400. At block 316, the software applications 204 can communicate with the computer system 240A of the potential attacker in order to request a multifactor authentication (MFA) from the potential attacker. This may serve as a deterrent for the potential attacker.

At block 318, the software applications 204 are configured to retrieve metadata of the potential attacker. The software applications 204 can retrieve the user profile of the potential attacker from the user profiles 242 and select metadata about the potential attacker for display to the potential victim. At block 320, the software applications 204 are configured to cause an overlay 430 (depicted in FIG. 6) of metadata about the potential attacker to be displayed on the viewable screen of the display 119 for the potential victim, for example, on computer system 240B. After retrieving the metadata of the user account of the potential attacker, there can be many examples of metadata that can be displayed to the potential victim.

Figure 6:
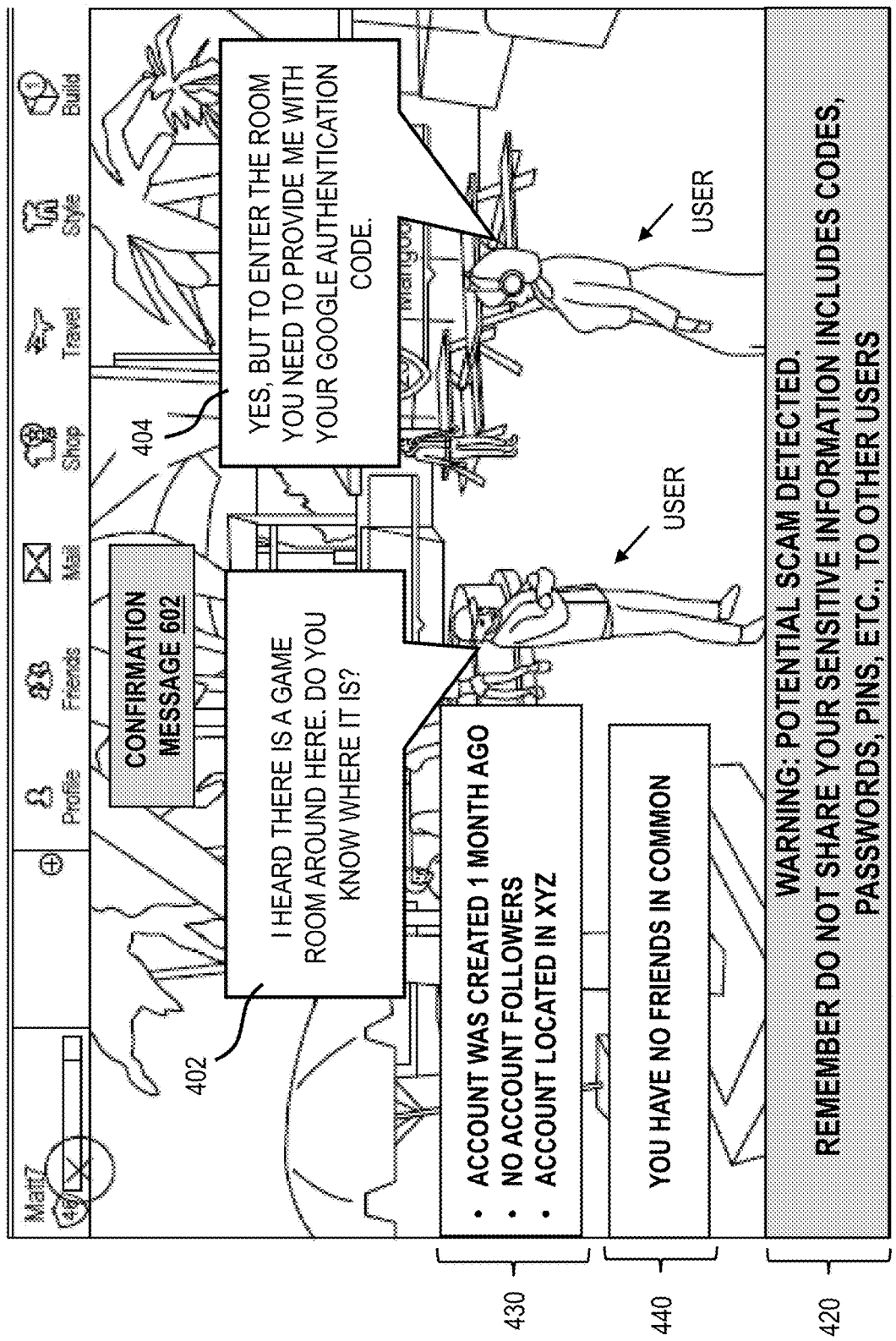
FIG. 6 depicts an example interactive communication environment in which one or more overlays are displayed as an overlaid alert/warning on the screen viewed by a potential victim and/or a potential attacker according to one or more embodiments of the present invention.

In the example scenario, to help the user discover and avoid potential scams, the software applications 204 gather and display different details about the potential attacker to the potential victim to help the user assess the situation. Some of those details displayed to the potential victim include account age, account followers, and account metadata of the potential attacker. FIG. 6 depicts an example interactive communication environment 400 (e.g., a virtual environment in virtual reality) in which overlays are displayed as overlaid alerts/warnings on the screen viewed by the potential victim according to one or more embodiments.

Account Age: one of the most common trends regarding scammers is that they are constantly creating new accounts, either because their accounts are banned and/or to avoid being recognized by a previous victim. In one or more embodiments, the software applications 204 are configured to gather the creation date of the account, and then the creation data can be displayed to the potential victim as the overlay 430 in FIG. 6. In one aspect, to protect the potential attacker's privacy, the creation date may be masked, and the software applications 204 can present an average date, for example, presenting the lifespan of the account by days, weeks, months, years, etc. For example, an overlay may indicate that "this account was created 1 month ago", or "this account was created 2 months ago".

Account Followers: software applications 204 are configured to verify the number of followers or friends of the potential attacker's account for display as the overlay 430 for the potential victim. Additionally, the software applications 204 are configured to check if there are any friends/followers in common between the potential attacker and the potential victim, and then display such information to the potential victim as overlay 440. The overlay 440 may indicate that "you have not friends in common", which may suggest that the request for personal information is an attack.

Account Metadata: software applications 204 are configured to gather other relevant account metadata to enhance this analysis, which include but is not limited to: the IP address of the computer system 240B of the potential attacker, the geographical location of the computer system 240B of potential attacker, the connected time in the current session of the computer system 240B of the potential attacker, etc. The account metadata can be displayed in the overlay 430.

Potential Victim's Account: software applications 204 are configured to consider relevant aspects of the victim account while performing the evaluation. For example, software applications 204 are configured to check and determine whether the potential victim and potential attacker have direct connections (for example, created the same day, have the same IP, are associated "friends" on social media). The software applications 204 are configured to display any direct connections between the potential victim and potential attacker as overlay 440 in FIG. 6.

Although the overlays discussed herein cover a portion of the content viewable on the screens, the overlays may cover an entirety of the viewable screen or nearly an entirety of the viewable screen. The overlays can be animated and move from one end of the viewable screen to another end. The overlays may start a first size (e.g., small) and increase to a second size (e.g., large), or vice versa.

As discussed herein, the software applications 204 are configured to execute various actions in the interactive communication environment 400 to prevent the potential attack. For example, in response to the potential attack, the software applications 204 can cause visual alerts such as modifying the viewable screen displayed on the display 119 of the computer system 240B of the potential victim in the interactive communication environment. In one or more embodiments, the viewable screen of the potential victim may flash, blank out, change colors, display a caution icon, etc., as a warning that there is a request for personal sensitive information. Before the potential victim is enabled to type (or speak) information to be output in the interactive communication environment for the potential attacker to view or hear, a confirmation message 602 (depicted in FIG. 6) can be displayed on the viewable screen of the potential victim to confirm that the potential victim understands that personal sensitive information has been requested and should not be provided to the potential attacker. Similarly, the software applications 204 can cause audio alerts such as audio alarms and/or voice messages to be output on the speakers 123 of the computer system 240B of the potential victim in the interactive communication environment, where the audio alarms and voice messages are to warn the potential victim that personal sensitive information has been requested and should not be provided to the potential attacker. The software applications 204 can cause the user's microphone to be temporarily disabled to thereby prevent the potential victim from being heard speaking the sensitive information, and can require the potential victim to first speak or select a confirmation message 602 (e.g., displayed on the viewable screen in FIG. 6) as confirmation that the potential victim understands that a request for personal sensitive information is in progress. The software applications 204 may prevent the audio spoken by the user from being uploaded and/or heard in the interactive communication environment, until the confirmation message 602 is selected or spoken by the potential victim. In response to the confirmation, which can be a verbal response, a textual response, and/or a selection (e.g., tap) of the confirmation message 602 by the potential victim, the microphone 123 of the potential victim is enabled for audio to be heard in the interactive communication environment. The software applications 204 may temporarily disable the text of the user, thereby causing the text of the user to be blocked from being uploaded and/or displayed in the interactive communication environment, until the confirmation message 602 is selected or spoken by the potential victim. In accordance with one or more embodiments, the software applications 204 can cause many temporary security actions to be performed to block, disable, etc., one or more functions of the potential victim in the interactive communication environment 400, such that the user is prevented from communicating personal sensitive information as a response to the scam or attack. The one or more functions in the interactive communication environment can be blocked for a predefined period of time, acting as a reflection period or delay, before the potential victim is permitted to enter information by voice or text for output in the interactive communication environment 400.

Technical solutions provide cybersecurity protection in the interactive communication environment. In one or more embodiments, the system coverts conversations (audio) from immersive experiences (e.g., in virtual reality such as the Metaverse®) and parses them into text for real time assessment (using, e.g., NLP). The system displays a message to the user as an alert about potential scams or a direct social engineering attack based on an NLP analysis. The system gathers account data related to virtual reality, parses the data (modify or mask it), and overlays the data to the potential victim.

Figure 7:
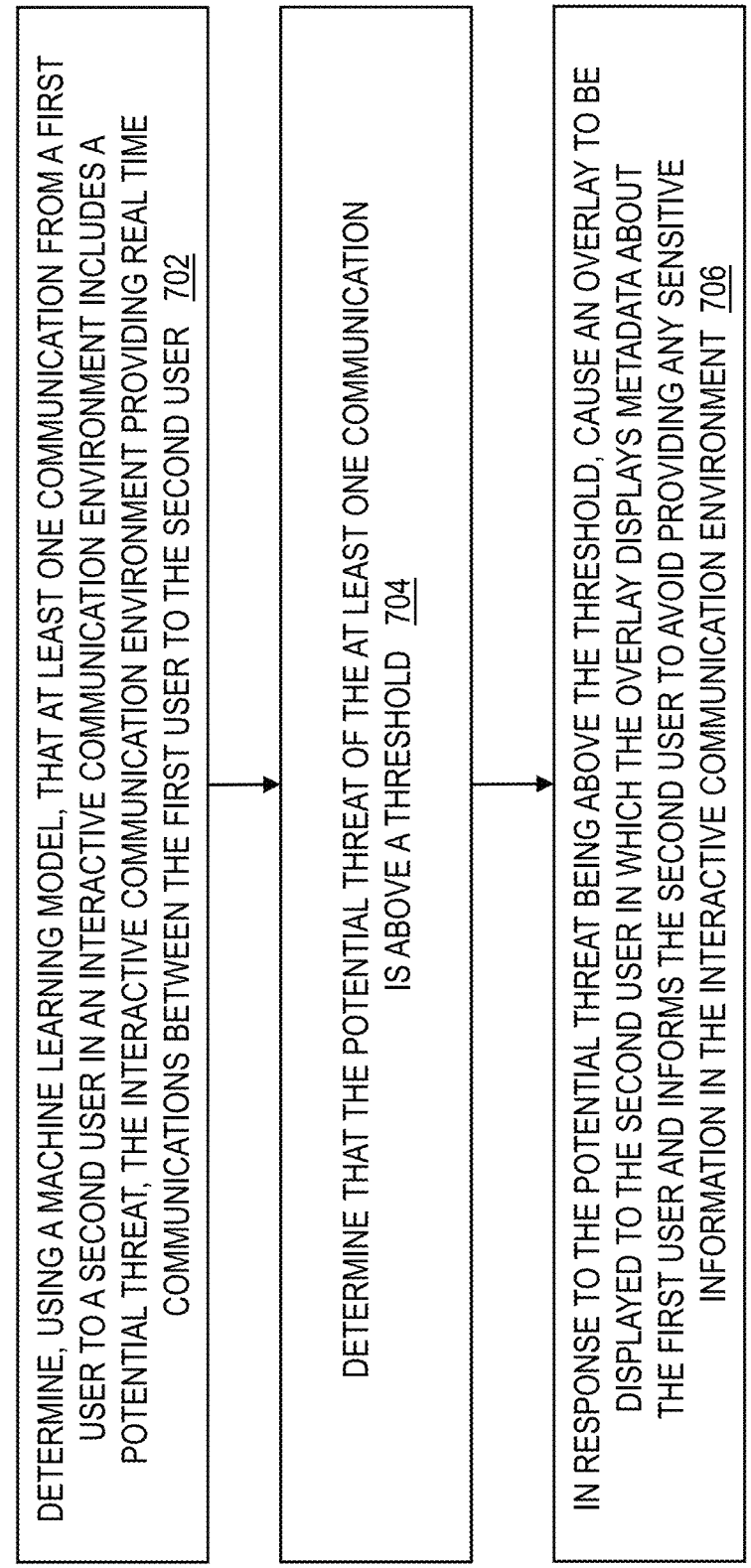
FIG. 7 is a flowchart of a computer-implemented method for automatically preventing scams in real time in an interactive communication environment and for automatically performing security actions to prevent the scam based on the potential threat according to one or more embodiments of the present invention.

FIG. 7 is a flowchart of a computer-implemented method 700 for automatically preventing scams in real time in an interactive communication environment and for automatically performing security actions to prevent the computer attack/scam based on the potential threat (i.e., scam, attack, etc.) according to one or more embodiments. Reference can be made to any figures discussed herein.

At block 702, the software applications 204 are configured to use a machine learning model (e.g., NLP model 28) to determine that at least one communication (e.g., communication 404) from a first user (e.g., potential attacker on computer system 240A) to a second user (e.g., potential victim on computer system 240B) in an interactive communication environment 400 includes a potential threat, the interactive communication environment 400 providing real time communications between the first user of a first computer system 240A to the second user of a second computer system 240B (and vice versa). At block 704, the software applications 204 are configured to determine that the potential threat of the at least one communication (e.g., communication 402) is above a threshold. At block 706, the software applications 204 are configured to, in response to the potential threat being above the threshold, cause an overlay (e.g., overlays 420, 430, and/or 440) to be displayed to the second user on the second computer system 240B in which the overlay displays metadata about the first user (e.g., potential attacker on computer system 240A) and informs the second user (e.g., potential victim on computer system 240B) to avoid providing any sensitive information in the interactive communication environment 400.

In accordance with one or more embodiments, the machine learning model is a natural language processing (NLP) model (e.g., NLP model 228). The metadata displayed about the first user comprises account creation information of the first user (e.g., potential attacker on computer system 240A). The metadata displayed about the first user comprises an indication of any account followers of the first user (e.g., potential attacker on computer system 240A). The metadata displayed about the first user comprises an indication of whether the first user (e.g., potential attacker on computer system 240A) has any relationship in common with the second user (e.g., potential victim on computer system 240B). The metadata displayed about the first user (e.g., potential attacker on computer system 240A) comprises at least one of an Internet protocol address, a location, and a connected time of the first user. A rules-based algorithm 224 is used to determine that the potential threat of the at least one communication 402 is above a threshold; the overlay (e.g., overlays 420, 430, and 440) is configured to cause a modification of a viewing screen of the second user, the modification being a visual change that interrupts a conversation between the second user and the first user; and the first computer system 240A and the second computer system 240B are required for interactive access to the interactive communication environment.

In one or more embodiments, the NLP model 228 can include various engines/classifiers and/or can be implemented on a neural network. The features of the engines/classifiers can be implemented by configuring and arranging the computer system 202 to execute machine learning algorithms. In general, machine learning algorithms, in effect, extract features from received data (e.g., the complete message formed of segmented messages) in order to "classify" the received data. Examples of suitable classifiers include but are not limited to neural networks, support vector machines (SVMs), logistic regression, decision trees, hidden Markov Models (HMMs), etc. The end result of the classifier's operations, i.e., the "classification," is to predict a class (or label) for the data. The machine learning algorithms apply machine learning techniques to the received data in order to, over time, create/train/update a unique "model." The learning or training performed by the engines/classifiers can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In one or more embodiments, the engines/classifiers are implemented as neural networks (or artificial neural networks), which use a connection (synapse) between a pre-neuron and a post-neuron, thus representing the connection weight. Neuromorphic systems are interconnected elements that act as simulated "neurons" and exchange "messages" between each other. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. After being weighted and transformed by a function (i.e., transfer function) determined by the network's designer, the activations of these input neurons are then passed to other downstream neurons, which are often referred to as "hidden" neurons. This process is repeated until an output neuron is activated. Thus, the activated output neuron determines (or "learns") and provides an output or inference regarding the input.

Training datasets (e.g., training data 206) can be utilized to train the machine learning algorithms. The training datasets can include historical data of past tickets and the corresponding options/suggestions/resolutions provided for the respective tickets. Labels of options/suggestions can be applied to respective tickets to train the machine learning algorithms, as part of supervised learning. For the preprocessing, the raw training datasets may be collected and sorted manually. The sorted dataset may be labeled (e.g., using the Amazon Web Services® (AWS®) labeling tool such as Amazon SageMaker® Ground Truth). The training dataset may be divided into training, testing, and validation datasets. Training and validation datasets are used for training and evaluation, while the testing dataset is used after training to test the machine learning model on an unseen dataset. The training dataset may be processed through different data augmentation techniques. Training takes the labeled datasets, base networks, loss functions, and hyperparameters, and once these are all created and compiled, the training of the neural network occurs to eventually result in the trained machine learning model (e.g., trained machine learning algorithms). Once the model is trained, the model (including the adjusted weights) is saved to a file for deployment and/or further testing on the test dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
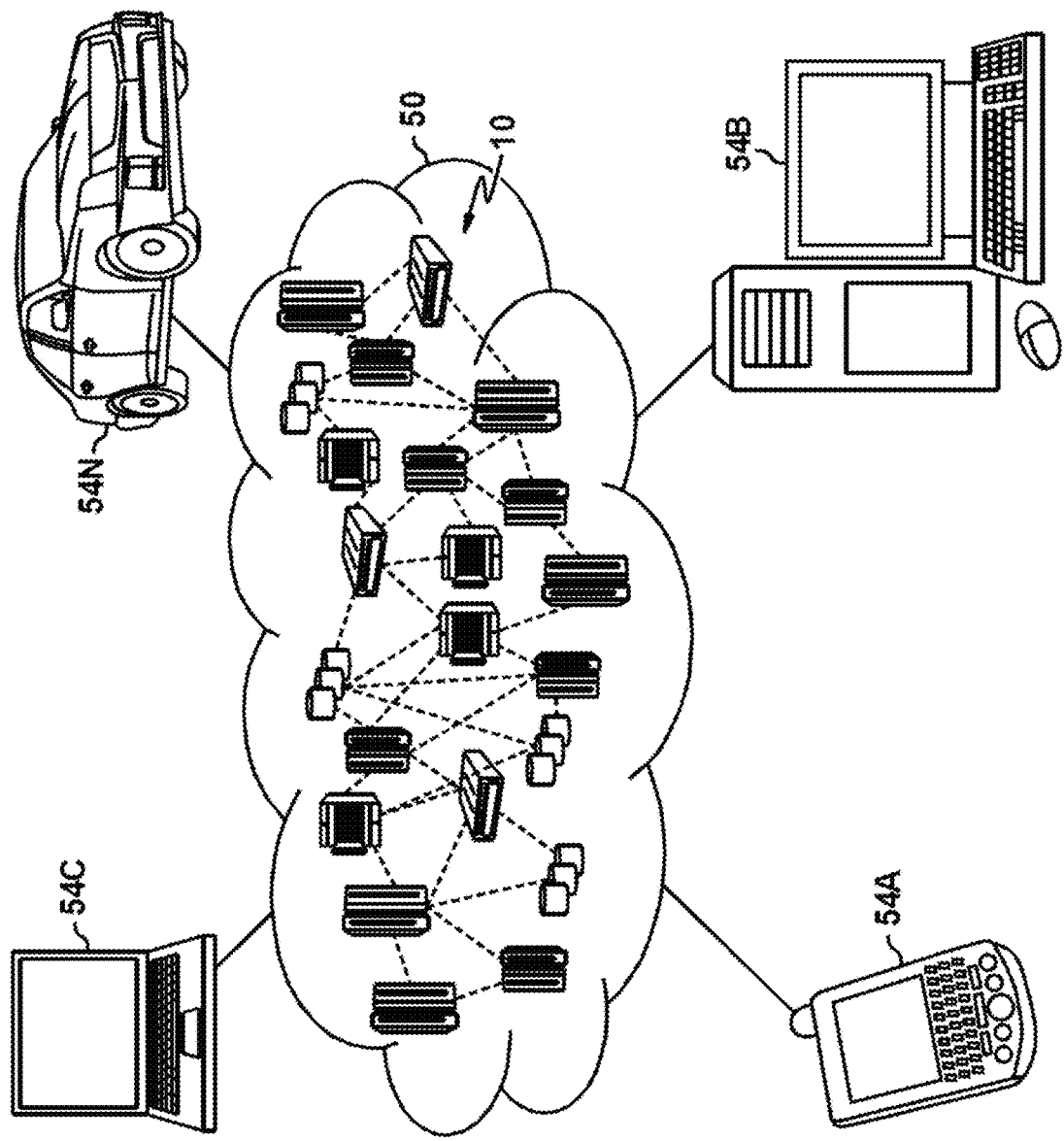
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
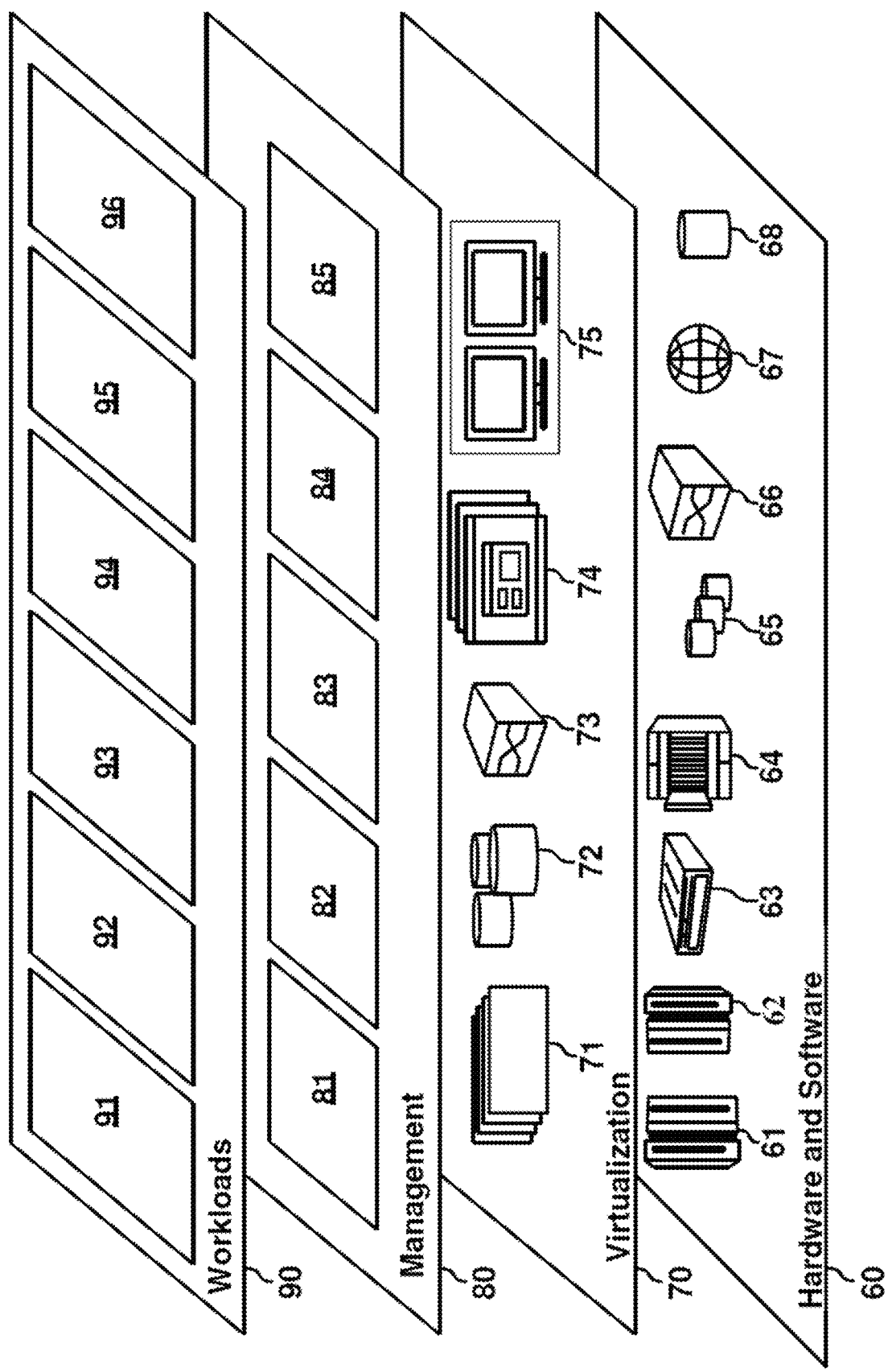
FIG. 9 depicts abstraction model layers according to one or more embodiments of the present invention.

Referring now to FIG. 9, a set of functional abstraction layers provided by cloud computing environment 50 (depicted in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining, using a machine learning model, that at least one communication from a first user to a second user in an interactive communication environment includes a potential threat, the interactive communication environment comprising a virtual reality that provides real time communications between the first user of a first computer system to the second user of a second computer system;
    determining that the potential threat of the at least one communication is above a threshold in the virtual reality; and
    in response to the potential threat being above the threshold, causing an overlay to be displayed to the second user on the second computer system in which the overlay displays metadata about the first user and informs the second user to avoid providing any sensitive information in the virtual reality.

2. The computer-implemented method of claim 1, wherein the machine learning model is a natural language processing (NLP) model.

3. The computer-implemented method of claim 1, wherein the metadata displayed about the first user comprises account creation information of the first user.

4. The computer-implemented method of claim 1, wherein the metadata displayed about the first user comprises an indication of any account followers of the first user.

5. The computer-implemented method of claim 1, wherein the metadata displayed about the first user comprises an indication of whether the first user has any relationship in common with the second user.

6. The computer-implemented method of claim 1, wherein the metadata displayed about the first user comprises at least one of an Internet protocol address, a location, and a connected time of the first user.

7. The computer-implemented method of claim 1, wherein:
    a rules-based algorithm is used to determine that the potential threat of the at least one communication is above the threshold;
    the overlay is configured to cause a modification of a viewing screen of the second user, the modification being a visual change that interrupts a conversation between the second user and the first user; and
    the first computer system and the second computer system are required for interactive access to the interactive communication environment.

8. A system comprising:
    a memory having computer readable instructions; and
    one or more processors for executing the computer readable instructions, the computer readable instructions controlling the one or more processors to perform operations comprising:
        determining, using a machine learning model, that at least one communication from a first user to a second user in an interactive communication environment includes a potential threat, the interactive communication environment comprising a virtual reality that provides real time communications between the first user of a first computer system to the second user of a second computer system;
        determining that the potential threat of the at least one communication is above a threshold in the virtual reality; and
        in response to the potential threat being above the threshold, causing an overlay to be displayed to the second user on the second computer system in which the overlay displays metadata about the first user and informs the second user to avoid providing any sensitive information in the virtual reality.

9. The system of claim 8, wherein the machine learning model is a natural language processing (NLP) model.

10. The system of claim 8, wherein the metadata displayed about the first user comprises account creation information of the first user.

11. The system of claim 8, wherein the metadata displayed about the first user comprises an indication of any account followers of the first user.

12. The system of claim 8, wherein the metadata displayed about the first user comprises an indication of whether the first user has any relationship in common with the second user.

13. The system of claim 8, wherein the metadata displayed about the first user comprises at least one of an Internet protocol address, a location, and a connected time of the first user.

14. The system of claim 8, wherein:
- a rules-based algorithm is used to determine that the potential threat of the at least one communication is above the threshold;
- the overlay is configured to cause a modification of a viewing screen of the second user, the modification being a visual change that interrupts a conversation between the second user and the first user; and
- the first computer system and the second computer system are required for interactive access to the interactive communication environment.

15. A computer program product comprising a computer readable storage medium having program instructions embodied therewith, the program instructions executable by one or more processors to cause the one or more processors to perform operations comprising:
- determining, using a machine learning model, that at least one communication from a first user to a second user in an interactive communication environment includes a potential threat, the interactive communication environment providing real time communications between the first user of a first computer system to the second user of a second computer system;
- determining that the potential threat of the at least one communication is above a threshold; and
- in response to the potential threat being above the threshold, causing an overlay to be displayed to the second user on the second computer system in which the overlay displays metadata about the first user and informs the second user to avoid providing any sensitive information in the interactive communication environment, wherein the metadata displayed about the first user comprises account creation information of the first user.

16. The computer program product of claim 15, wherein the interactive communication environment comprises a virtual reality.

17. The computer program product of claim 15, wherein the metadata displayed about the first user comprises an indication of any account followers of the first user.

18. The computer program product of claim 15, wherein the metadata displayed about the first user comprises an indication of whether the first user has any relationship in common with the second user.

19. The computer program product of claim 15, wherein the metadata displayed about the first user comprises at least one of an Internet protocol address, a location, and a connected time of the first user.

* * * * *